US008626580B2

(12) United States Patent
Chin et al.

(10) Patent No.: US 8,626,580 B2
(45) Date of Patent: Jan. 7, 2014

(54) COUPON-POINT SYSTEM FOR MANAGING SUPPORTIVE SERVICES TO BUSINESS IN A SEMICONDUCTOR FOUNDRY ENVIRONMENT

(75) Inventors: Sheng-Chi Chin, Hsin-Chu (TW);
Shouh-Dauh Fred Lin, Hsin-Chu (TW);
Lawrence Chen, Hsin-Chu (TW);
Chun-Mai Liu, Hsin chu (TW);
Huang-Sheng Lin, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1079 days.

(21) Appl. No.: 11/468,896

(22) Filed: Aug. 31, 2006

(65) Prior Publication Data

US 2007/0156526 A1   Jul. 5, 2007

Related U.S. Application Data

(60) Provisional application No. 60/712,863, filed on Aug. 31, 2005.

(51) Int. Cl.
*G06Q 30/00* (2012.01)
*G06Q 30/02* (2012.01)

(52) U.S. Cl.
CPC ........ *G06Q 30/0207* (2013.01); *G06Q 30/0217* (2013.01)
USPC ...................................... 705/14.19; 705/14.1

(58) Field of Classification Search
USPC ................................ 705/14; 704/14.1, 14.19
See application file for complete search history.

(56) References Cited

U.S. PATENT DOCUMENTS

| 4,674,041 | A  | * | 6/1987  | Lemon et al.  | 705/14    |
| 5,353,218 | A  | * | 10/1994 | De Lapa et al. | 705/14    |
| 5,483,049 | A  | * | 1/1996  | Schulze, Jr.  | 705/14.13 |
| 7,047,514 | B2 | * | 5/2006  | Mizuno et al. | 716/14    |
| 7,496,543 | B1 | * | 2/2009  | Bamford et al. | 705/400   |
| 2002/0055875 | A1 | * | 5/2002  | Schulze et al. | 705/14   |
| 2002/0095333 | A1 | * | 7/2002  | Jokinen et al. | 705/14   |
| 2002/0120521 | A1 | * | 8/2002  | Forth et al.   | 705/26   |
| 2002/0143633 | A1 | * | 10/2002 | Kunstadt       | 705/16   |
| 2002/0169662 | A1 | * | 11/2002 | Claiborne      | 705/14   |
| 2003/0130863 | A1 | * | 7/2003  | Grey et al.    | 705/1    |

* cited by examiner

*Primary Examiner* — James W Myhre
(74) *Attorney, Agent, or Firm* — Haynes and Boone, LLP

(57) ABSTRACT

A semiconductor coupon-service system, includes a coupon-service module for managing a semiconductor service; a coupon generator, in connection with the semiconductor service, for generating a coupon associated with the semiconductor service; and a coupon maintainer, in connection with the semiconductor service, for processing coupon operations associated with the coupon.

21 Claims, 8 Drawing Sheets

COUPON-POINT SYSTEM FOR MANAGING SUPPORTIVE SERVICES TO BUSINESS IN A SEMICONDUCTOR FOUNDRY ENVIRONMENT

CROSS-REFERENCE

This application claims priority from U.S. Provisional Patent Application Ser. No. 60/712,863 filed on Aug. 31, 2005, entitled "Coupon-Point System for Managing Supportive Services to Business in a Semiconductor Foundry Environment".

BACKGROUND

A semiconductor integrated circuit (IC) company, such as a semiconductor wafer foundry, provides various supportive services to customers, necessary for the realization of wafer business. Wafer foundry needs a service system for developing, deploying, sustaining, and running the services. However, current services are provided at various service levels, not cost-effective, inconsistent, and not fully coordinated between the customers and the wafer foundry. Further, the current services have no tracking mechanism and no uniformed procedure.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
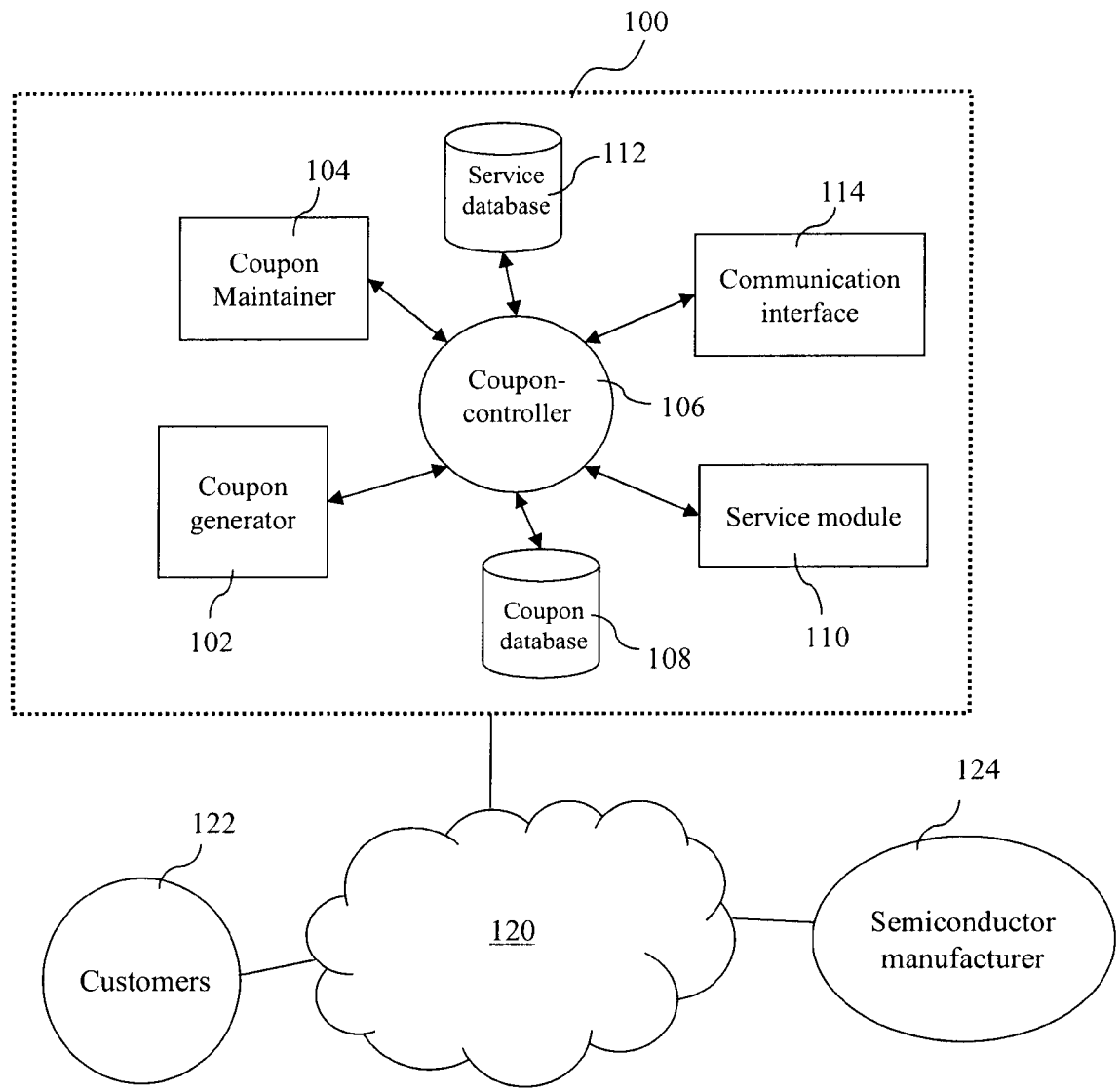
FIG. 1 is a block diagram of an embodiment of a coupon-point system to implement coupon-based semiconductor services.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a block diagram of an embodiment of a coupon-point system 100 (coupon-service system) to implement coupon-based semiconductor services. The coupon-point system 100 includes a coupon generator 102. The coupon generator 102 is designed to generate a coupon for a semiconductor manufacturing service (semiconductor service) such as a semiconductor foundry service associated with a semiconductor foundry. Such generated a coupon is defined by a plurality of coupon attributes such as a set of exemplary coupon attributes 200 illustrated in FIG. 2. The coupon attributes 200 include a point 202 to represent coupon value. For example, a coupon of 10 points may represent a semiconductor service of one thousand dollars. The coupon attributes 200 include a duration 204 to describe life time of the coupon, during which the coupon is effective for semiconductor services. For example, the duration 204 may be defined as no time limitation so that the coupon can be used any time. The duration 204 may be alternatively defined to be expired at a particular deadline, or only effective through a particular period of time such as six months or one year from the first use of the coupon. The coupon attributes 200 further includes an association 206 to describe the association between the coupon and semiconductor services. In one embodiment, the coupon may be associated with a particular product, a particular technology, and/or a particular customer. These associations limit the coupon to be only usable for the associated product, the associated technology, and/or the associated customer. For example, if the coupon is defined to be associated with mask services, then it can not be used for wafer services. In another example, if the coupon is defined to be associated with 90 nanometer technology node and 300 mm wafer, then the coupon is only usable for the semiconductor service associated with 90 nanometer technology node and 300 mm wafer. In another example, if the coupon is associated with customer A, then the coupon can not be used by customers other than customer A. If a coupon is associated with Cyber-Shuttle service, then the coupon can not be used for Design for manufacturing (DFM) or lithography process check (LPC) service. The coupon attributes, including point 202, duration 204, and association 206, may be subject to modification during the coupon's lifetime by a semiconductor service provider.

Figure 3:
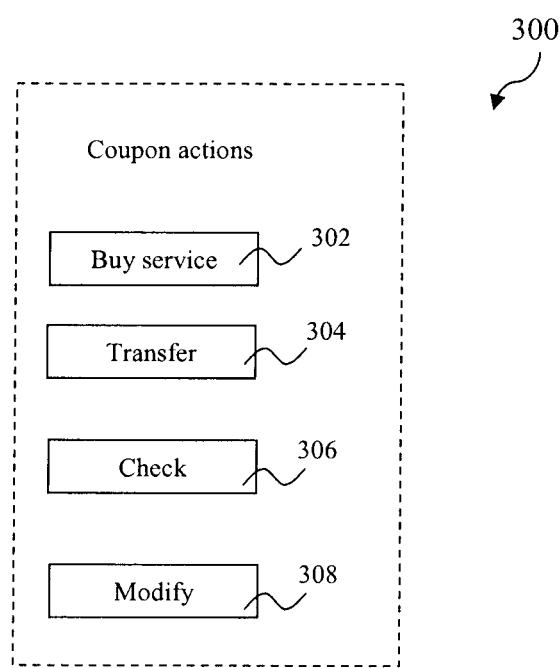
FIG. 3 is a block diagram of various embodiments of a coupon action enabled in the coupon-point system of FIG. 1.

The coupon-point system 100 includes a coupon maintainer 104. The coupon maintainer 104 functions for maintaining a coupon through its lifetime. The coupon maintainer 104 is designed to respond to a plurality of coupon actions and manage thereof. Referring to FIG. 3, exemplary coupon actions 300 is illustrated. The coupon actions 300 includes buying a semiconductor service 302 using a coupon; transferring 304 a coupon such that it is associated with a different product, a different technology, and/or a different customer; checking 306 a coupon by a customer or a service provider to view status of the coupon; and modifying 308 a coupon that changes the attributes of the coupon. A coupon action 300 may be initiated by a customer or a service provider. A coupon action 300 may be controlled, coordinated, and/or implemented by the coupon maintainer 104.

The coupon-point system 100 may further include a coupon controller 106. The coupon controller 106 is configured for communicating with the coupon generator 102 and the coupon maintainer 104. The coupon controller 106 is designed to coordinate the coupon generation and other actions between the generator 102 and the coupon maintainer 104.

The coupon-point system 100 may further include a coupon database 108 to store coupon-related data including a plurality of coupons, their attributes, and their circulation records. The coupon database 108 is configured to communicate with the coupon generator 102, the coupon maintainer 104, and the coupon controller 106. The coupon database 108 may include a data structure such as a tree structure that the coupon data are efficiently accessible and maintainable.

Figures 4, 5:
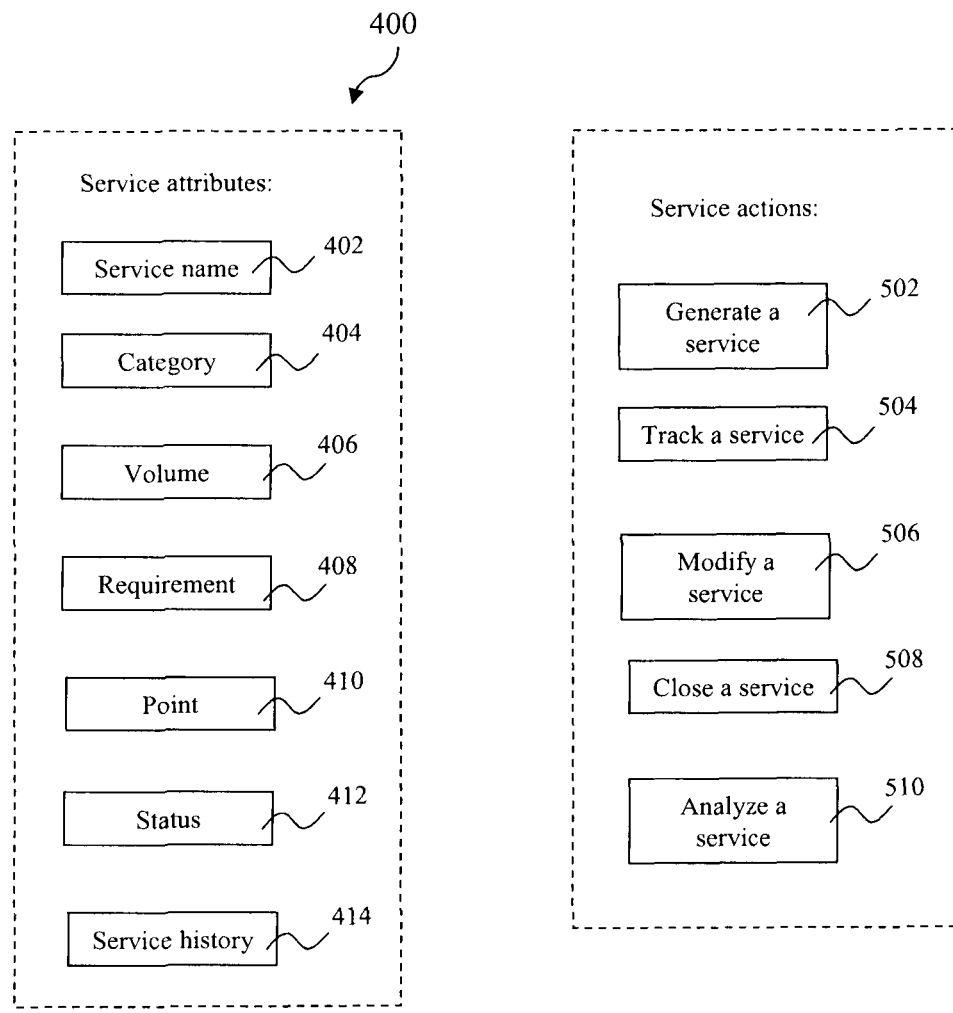
FIG. 4 is a block diagram of an embodiment of service attributes used in the coupon-point system of FIG. 1.
FIG. 5 is a block diagram of various embodiments of a semiconductor service used in the coupon-point system of FIG. 1.

The coupon-point system 100 may further include a coupon-service module 110 designed for managing semiconductor services. The semiconductor services may be categorized as standard semiconductor services, optional semiconductor services, and alliance semiconductor services. The standard semiconductor services are default services provided by the semiconductor manufacturer as a part of semiconductor products such as wafer products or mask products. The alliance program semiconductor services are provided by partners of the semiconductor manufacturer. A customer may need to establish contract directly with the service partners. The optional semiconductor services are not required but available services provided by the semiconductor manufacturer and are optional to the customer. The optional semiconductor service may include CyberShuttle, Design for manufacturing (DFM), lithography process check (LPC), Fab support service, assembly and test service, eFoundry service, turnkey manufacturing service, or a combination thereof. For example, an optional semiconductor service may be a special request from a customer to turn a normal wafer lot into a hot lot to speed its fabrication and shorten the cycle time in semiconductor Fab, which will cost the semiconductor manufacturer extra effort. In another example, an optional semiconductor service may be an extra on-line test of a wafer lot requested by the customer for engineering purpose. The coupon-service module 110 may filter out the standard services and alliance program services, and redirect them to proper semiconductor entity such as a service provider. The coupon-service module 110 may function to particularly open an optional semiconductor service to a specified product, enable coupon circulation in the optional semiconductor service, and maintain the optional semiconductor service through its lifetime. An optional semiconductor service may include a plurality of attributes changeable and traceable through the lifetime of the optional semiconductor service. Referring to FIG. 4, an exemplary service attributes 400 includes service name 402, service category 404 (may include information such as what semiconductor service, to which product type, and which customer product), service volume 406 (a volume of semiconductor product to be served), special requirement 408 applied to the service, service point 410 (cost of the service evaluated in terms of coupon point), service status 412 (including service in progress, service on hold, and service closed), and service history 414. Further referring to FIG. 5, a service action applicable to the semiconductor service and operable by the coupon-service module 110 may include generating a semiconductor service 502, tracking the semiconductor service 504, modifying the semiconductor service 506, closing the semiconductor service 508, analyzing the semiconductor service 510, or combinations thereof. For example, when a semiconductor service is completed, a proper semiconductor service action may be closing the semiconductor service. In the closing action, the coupon-service module 110 may put the semiconductor service in a closed status such that no further action can be applied thereto but all related service data may be saved for future analysis or other use. In another example, a semiconductor service action is analyzing one or more semiconductor services including services in progress and services closed. The analysis may result in or lead to service evaluation, service improvement, and service feedback to customers. The coupon-service module 110 may alternatively be a portion of a semiconductor manufacturer distributed in several semiconductor manufacturing entities integral to the coupon-point system 100.

The coupon-point system 100 may further include a semiconductor service database 112 to store semiconductor service related data. The semiconductor service database 112 may include a data structure such as a tree structure that semiconductor service data can be efficiently accessed. The semiconductor service database 112 is configured to communicate with the coupon-service module 110.

The coupon-point system 100 may further include a communication interface 114 enabling communications among the coupon-point system 100, the customers 122, the semiconductor manufacturer 124, or a virtual fab. The semiconductor manufacturer 124 may include mask workshops and wafer fabrication facilities (wafer fab).

Each entity of the coupon-point system 100 described above may include hardware, software, and proper coupling and configuration enabling its intended functions. For example, the coupon database 108 or the service database each may include a storage media to store relevant data. The coupon-point system 100 is further coupled to a network 120. The network 120 can be an internal network, the Internet, a virtual fab (eFoundry), or a combination thereof. The coupon-point system 100 is further coupled to a plurality of customers 122 and a semiconductor manufacturer 124 for providing semiconductor services to the customers 122.

Figure 6:
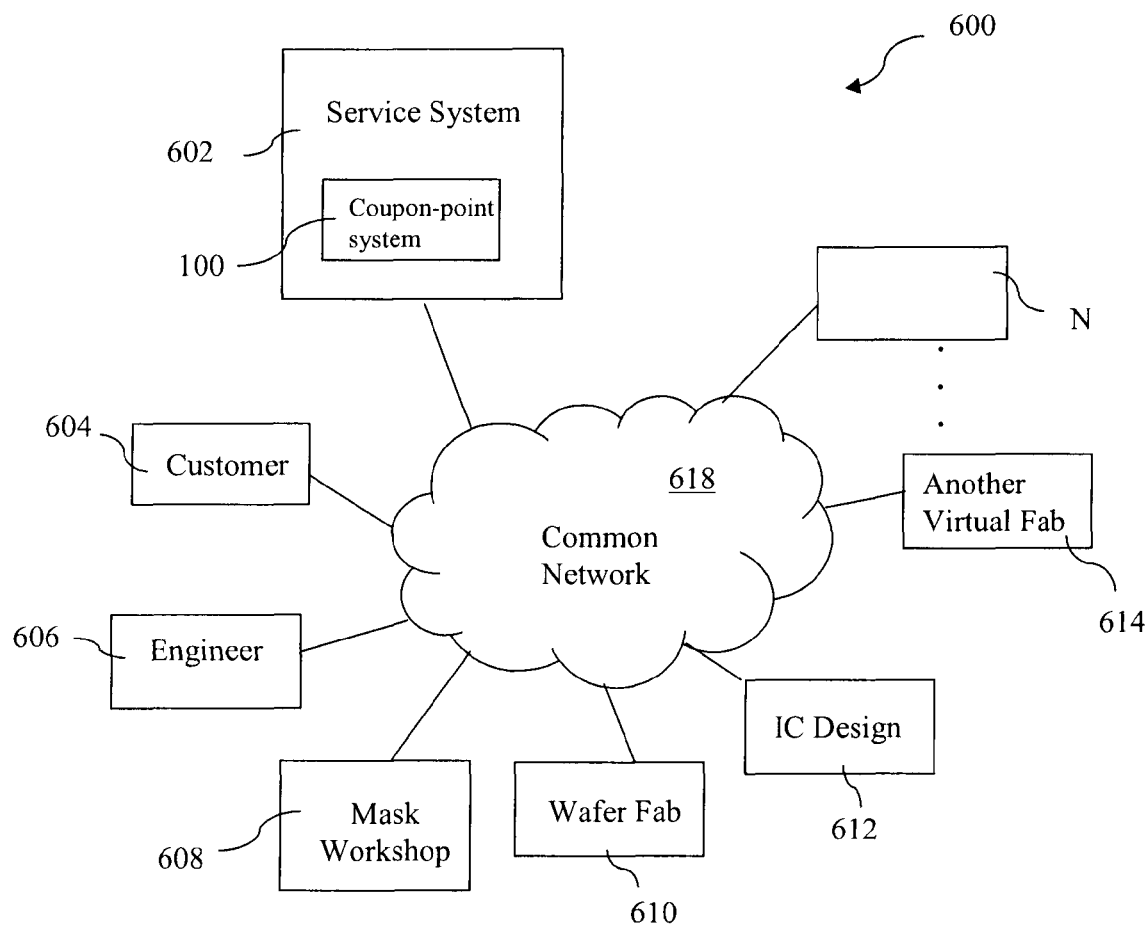
FIG. 6 is a block diagram of a virtual fabrication system, within which the coupon-point system of FIG. 1 is utilized.

FIG. 6 is a block diagram of one embodiment of a virtual fabrication (virtual fab or eFoundry) system 600, within which the coupon-point system 100 of FIG. 1 is utilized. The virtual fab 600 includes a plurality of entities 602, 604, 606, 608, 610, 612, 614, . . . , N that are connected by a communications network 618. The network 618 may be a single network, or may be a variety of different networks, such as an intranet and the Internet, and may include both wireline and wireless communication channels.

In the present example, the entity 602 represents a service system for service collaboration and provision, the entity 604 represents a customer, the entity 606 represents an engineer, the entity 608 represents a mask workshop, the entity 610 represents a wafer fabrication (fab) facility, the entity 612 represents an integrated circuit (IC) design module, and the entity 614 represents another virtual fab (e.g., a virtual fab belonging to a subsidiary or a business partner). Each entity may interact with other entities, and may provide services to and/or receive services from the other entities.

For purposes of illustration, each entity 602-614 may be referred to as an internal entity (e.g., an engineer, a mask workshop, a wafer fab, and an IC design module, etc.) that forms a portion of the virtual fab 600, or may be referred to as an external entity (e.g., a customer) that interacts with the virtual fab 600. It is understood that the entities 602-614 may be concentrated at a single location, or may be distributed, and that some entities may be incorporated into other entities. In addition, each entity 602-614 may be associated with system identification information that allows control of access to information within the system, based upon authority levels associated with each entity identification information.

The virtual fab 600 enables interaction among the entities 602-614 for the purpose of mask and/or wafer manufacturing, as well as the provision of services. In the present example, wafer manufacturing includes receiving a customer's IC order and the associated operations needed to produce the ordered ICs and send them to the customer, such as design, fabrication, testing, and shipping of the ICs.

Services provided by the virtual fab 600 may enable collaboration and information access in such areas as design, engineering, logistics, and material control. The services also includes semiconductor manufacturing services. In the design area, the customer 604 may be given access to information and tools related to the design of their product, via the service system 602. The tools may enable the customer 604 to perform yield enhancement analyses, layout information, service evaluation, and obtain similar information. In the engineering area, the engineer 606 may collaborate with other engineers using fabrication information regarding pilot yield runs, risk analysis, quality, reliability, and material control. The logistics area may provide the customer 604 with fabrication status, testing results, order handling, and shipping dates. It is understood that these areas are exemplary, and that more or less information may be made available via the virtual fab 600, as desired.

Another service provided by the virtual fab 600 may integrate systems between facilities, such as between the mask workshop 608 and the wafer fab facility 610. Such integration enables facilities to coordinate their activities. For example, integrating the mask workshop 608 and the wafer fab facility 610 may enable manufacturing information to be incorporated more efficiently into a fabrication process, and may enable wafer data from the metrology tools to be returned to the wafer fab facility 610 for improvement and incorporation.

The service system 602 further includes a coupon-point system 622 such as the coupon-point system 100 of FIG. 1. The coupon-point system 622 may be alternatively linked to the virtual fab 600 and the coupon-service module 110 may be alternatively integral to the service system 602. The coupon-point system 622 provides a mechanism to provide coupon-oriented semiconductor services to the customers and can be used to implement various semiconductor service actions and coupon actions associated with the semiconductor services. Described below are several examples.

Figures 7, 8:
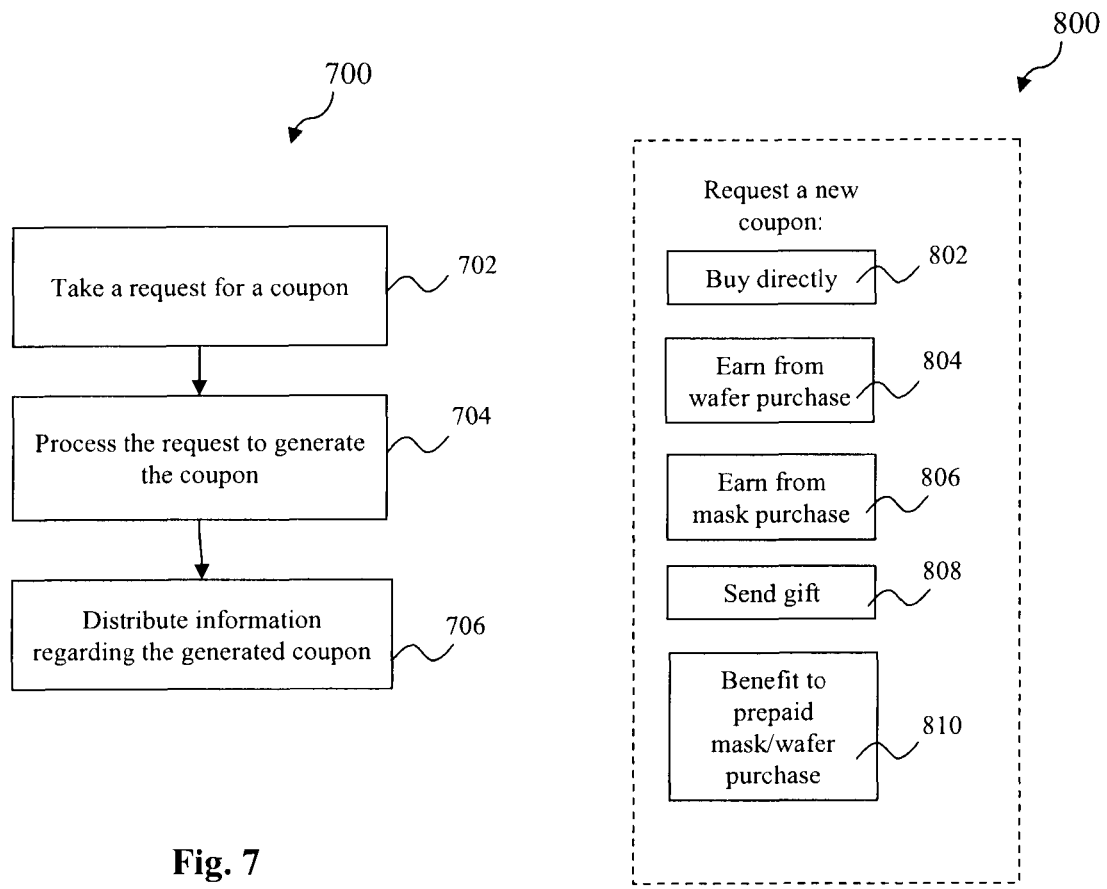
FIG. 7 is a simplified flowchart of an embodiment of a method for generating a coupon associated with a semiconductor service.
FIG. 8 is a block diagram of various embodiments of a coupon request enabled in the method of FIG. 7.

FIG. 7 is a simplified flowchart of an embodiment of a method 700 for generating a coupon to be used in one or more semiconductor services. The method 700 may be performed by the coupon generator 102 with coordination of other entities including the coupon controller, the coupon database 108, and the coupon-service module 110. The method 700 begins at step 702 by taking a request for a new coupon. The request may be initiated by a customer, a service provider, the coupon-service module 110, or a virtual fab. Referring to FIG. 8, the coupon request may include directly buying a coupon 802 by the customer 122 or through the coupon-service module 110; earning a coupon from a wafer purchase 804 initiated by the service provider or the service system 602; earning a coupon from a mask purchase 806 initiated by the service provider or the coupon-service module 110; sending a coupon gift 808 initiated by the service provider; or acquiring a benefit coupon through a prepaid mask or wafer purchase 810 by the service provider or the virtual fab. Step 702 may further include other actions such as initial screening to evaluate if the request acceptable.

Figure 2:
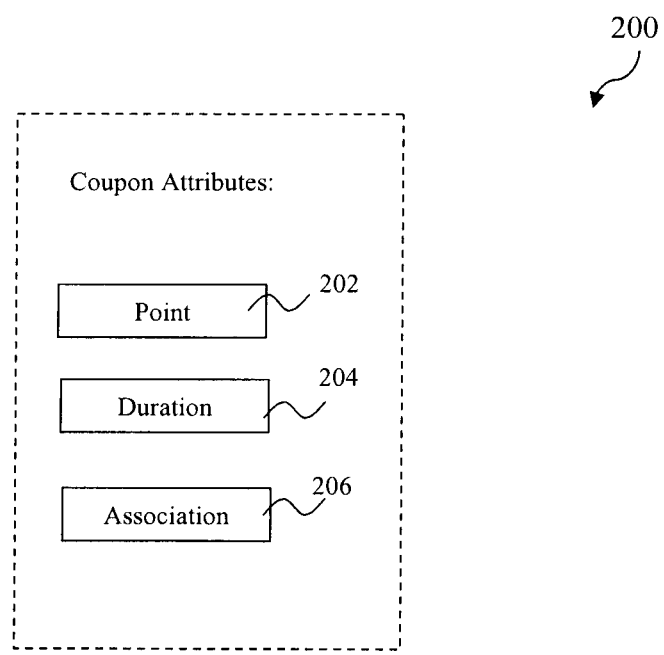
FIG. 2 is a block diagram of an embodiment of coupon attributes used in the coupon-point system of FIG. 1.

The method 700 then resumes to step 704 by processing the request to generate a coupon. For example, the coupon generator 102 extracts data from the coupon request and may further communicate with the requester (such as the customer) to acquire a plurality of coupon attributes such as the coupon attributes including point 202, duration 204, and association 206 as illustrated in FIG. 2. Then a new coupon is defined with the associated attributes and generated thereafter. The coupon database 108 is updated accordingly, for example, the new coupon and the associated data are added to the coupon database 108.

The method 700 then resumes to step 706 by distributing information regarding the generated coupon, which includes informing the customer of the generated coupon, updating relevant databases with the generated coupon, initiating relevant entities for subsequent actions. The relevant entities may include the service provider the coupon-service module 110, and/or the semiconductor manufacturer 124.

Figure 9:
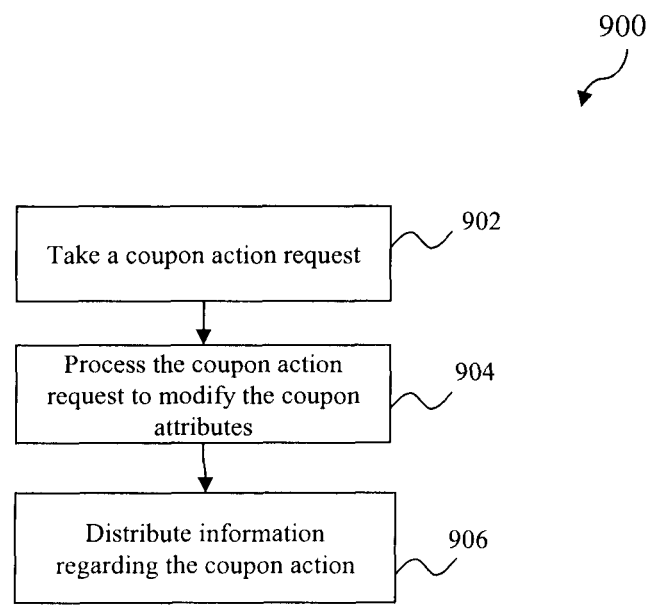
FIG. 9 is a simplified flowchart of an embodiment of a method for implementing a coupon action associated with a semiconductor service.

FIG. 9 is a simplified flowchart of an embodiment of a method for implementing a coupon action associated with a semiconductor service. The method 900 can be implemented by the coupon maintainer 104 with coordination of other entities including the coupon controller 106, the coupon database 108, the coupon generator 102, and the coupon-service module 110. The method 900 begins by taking a coupon action request at step 902. The coupon action request may be initiated by a customer, a service provider, the coupon-service module 110, or a virtual fab. The coupon action request may be selected from the group 300 of FIG. 3 including buying a semiconductor service 302 by the customer; transferring a coupon 304 such as transferring a coupon such that it is associated with a different semiconductor technology; checking status 306 of the coupon; and modifying 308 a coupon attribute. The coupon action request may be initiated by the customer, the service provider, the coupon-service module 110, or the semiconductor manufacturer 124. Step 902 may further include other operations such as initial screening to evaluate if the service action request is acceptable.

The method 900 then resumes to process the coupon action request at step 904 which includes but not limited to extracting action information, providing relevant coupon information, and/or modifying the attributes of the coupon. For example, to respond to a request of buying a semiconductor service, the coupon may be modified to have a less point value after offsetting the point of the requested semiconductor service. The coupon database 108 is updated accordingly such as the coupon attributes in the coupon database 108 are revised.

The method 900 then resumes to distribute information regarding the requested coupon action at step 906, which includes informing the semiconductor manufacturer to physically implement the semiconductor service and providing the relevant entities of the current coupon status.

Figure 10:
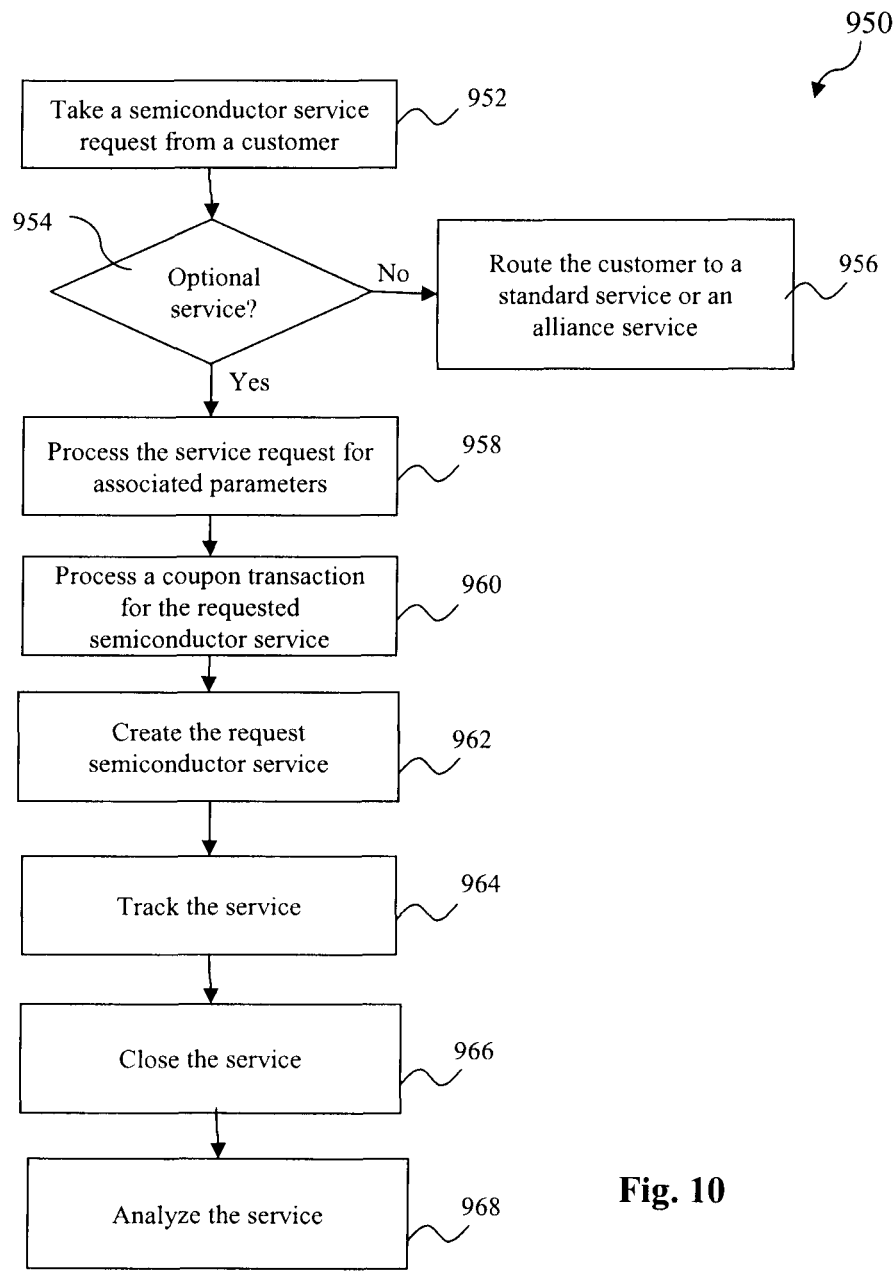
FIG. 10 is a simplified flowchart of an embodiment of a method for implementing a coupon based semiconductor service.

FIG. 10 is a simplified flowchart of an embodiment of a method 950 for implementing a coupon based semiconductor service. The method 950 can be implemented by the coupon-service module 110 with coordination of other entities such as the coupon controller 106, the coupon database 108, the service database 112, the coupon generator 102, and the coupon maintainer 104. The method 950 begins by taking a semiconductor service request by a customer at step 952. The customer needs to provide information to enable the semiconductor service. For example, the customer may provide attribute information of the requested semiconductor service. The semiconductor service may include CyberShuttle, design for manufacturing (DFM), lithography process check (LPC), fab support service, assembly and test service, eFoundry service, turnkey manufacturing service, or a combination thereof. Step 952 may include extracting information from the semiconductor service request and/or further interaction with the customer to tune the semiconductor service request.

At step 954, the requested semiconductor service is screened to determine if it is an optional semiconductor service. If not, the method 950 proceeds to the next step by redirecting the requester to other proper service module at step 956. Otherwise, the method proceeds to the next step by processing the service request to acquire the associated parameters at step 958, which includes the service attributes.

At step 960, the method 950 processes a coupon transaction such as using an existing coupon to buy the semiconductor service, buying a coupon and then buying the semiconductor service using the coupon, or asking a gift coupon and then buying the semiconductor service using the gift coupon. The coupon transaction may further include generating a coupon, and/or maintaining the coupon selected from the coupon actions 800 as shown in FIG. 8. The generating of the coupon may be implemented by the method 700 as illustrated in FIG. 7.

At step 962, the requested semiconductor service is generated. The generating of the semiconductor service may include defining the semiconductor service by its attributes, creating a corresponding semiconductor service record into the service database 112, informing relevant entities such as the customer, the service provider, and the semiconductor manufacturer.

Optionally, the method 950 may resume to the next step by tracking the generated semiconductor service at step 964, which can be initiated by the customer or the service provider. The tracking may involve interactions among the customer 122, coupon-point system 100, the service provider, and the semiconductor manufacturer. The tracking may be carried out during the lifetime of the semiconductor service.

The method 950 may resume to step 966 to close the semiconductor service when the semiconductor service is completed. When the service is closed, the service history may be kept but any further action applied to the semiconductor service is blocked unless the semiconductor service is revived.

The method 950 may resume to step 968 to analyze the semiconductor service. The analysis can be initiated by the customer for service inspection. The analysis can be initiated by the service provider to evaluate the service quality. Alternatively, the analysis may be performed to all closed semiconductor service records or a subset according to a schedule such as every three months.

One or more advantages may present in various embodiments described above. For example, the semiconductor manufacturer may properly enhance the quantity, and the level of service support through the tracking of coupon usage. The customers may easily understand and recognize the value of the services through coupon payment. The semiconductor manufacturer may employ this system to build business model of new service, implement promotion programs targeted to specific customer groups, and carry out effective purchase rebates or customer prepays. The coupon-point system allows the semiconductor manufacturer to track services, budgets and plan resources for services, and accentuate the service value. For example, the application of the coupon-point system and the methods to LPC service may create a model for effective customer prepay. In another example, the application of the coupon-point system and the methods to CyberShuttle service may create a model for effective purchase rebate. Furthermore, the optional semiconductor service is quantified, and the semiconductor service effort is budgeted and well arranged through the circulation of coupons.

Thus, the present disclosure provides a semiconductor coupon-service system. The system includes: a coupon-service module for managing a semiconductor service; a coupon generator, in connection with the semiconductor service, for generating a coupon associated with the semiconductor service; and a coupon maintainer, in connection with the semiconductor service, for processing coupon operations associated with the coupon. The system may further include: a coupon controller for coordinating and controlling the coupon generator and the coupon maintainer; and a coupon database designed for storing coupon related data. The system may further include: a service database designed for storing semiconductor service related data; and a communication interface module for communicating coupon and semiconductor service related information. The coupon may be defined with a plurality of attributes including points, durations, associations, and combination thereof. The coupon generator may be designed to generate a coupon responding to a coupon request including buying, earning, gifting, benefiting, and combination thereof. The coupon maintainer may be designed for responding to a coupon action selected from the group consisting of buying service, transferring coupon, checking, and modifying. The system may further include a link to an eFoundry system through a network. The eFoundry system may include connections operable to communicate with a plurality of entities selected from the group consisting of engineer module, customer module, mask workshop, wafer Fab, integrated circuit design, and combinations thereof. Semiconductor service may include a plurality of service entities each having a set of attributes selected from the group consisting of service name, category, volume, requirement, point, status, and service history. The semiconductor service may include processing a service action selected from the group consisting of generating a service, tracking a service, modifying a service, closing a service, and analyzing a service.

The present disclosure also provides a method including: processing a semiconductor service request; processing a coupon transaction responding to the semiconductor service request; and creating a semiconductor service to the semiconductor service request after the coupon transaction. The processing of the semiconductor service request may includes taking the semiconductor service request from a customer; redirecting the customer to one of a standard semiconductor service and an alliance semiconductor service if the semiconductor service request is not an optional semiconductor service; extracting service parameters from the semiconductor service request; and initiating the coupon transaction. The semiconductor service may be selected from CyberShuttle, Design for manufacturing (DFM), lithography process check (LPC), FAB support service, assembly and test service, eFoundry service, and turnkey manufacturing service. The processing of the coupon transaction may include at least one of: generating a coupon using a coupon generator; and implementing a coupon action associated with the coupon using a coupon maintainer. The generating of the coupon may include: processing a coupon request selected from the group consisting of buying, earning, gifting, benefiting, and a combination thereof; issuing the coupon based on the coupon request; and distributing information regarding the coupon. The issuing of the coupon may include defining the coupon with a plurality of attributes. The defining of the plurality of attributes may include defining point, duration, and association. The association may be defined as a limitation associated with the coupon, the limitation is selected from the group consisting of customer, product, and technology. The implementing of the coupon action may include: processing the coupon action; modifying the plurality of attributes based on the coupon action; and distributing information regarding the coupon action. The processing of the coupon action may include taking an action selected from the group consisting of buying service, transferring the coupon, checking, modifying, and combinations thereof. The distributing information regarding the coupon action may include distributing information to a customer, a service provider, and a coupon database. The method may further include at least one of: tracking the semiconductor service; closing the semiconductor service when the semiconductor service is completed; and analyzing the semiconductor service. The analyzing of the semiconductor service may include extracting data of the semiconductor service from a semiconductor service database for service evaluation.

The present disclosure also provides a method including: taking a coupon request; generating a coupon using a coupon generator; and implementing a coupon action to the coupon using a coupon maintainer. The taking of the coupon request may include taking a request selected from the group consisting of buying, earning, gift, benefit, and combination thereof. The generating of the coupon may include defining the coupon with a plurality of attributes selected from the group consisting of point, duration, association, and combinations thereof. The implementing a coupon action may includes: taking a coupon action selected from the group consisting of buying service, transferring the coupon, timing, checking, modifying, and combinations thereof; modifying coupon attributes based on information from the coupon action; and distributing information regarding the coupon action.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. Non-transitory computer readable media having computer-executable instructions embodied thereon that, when executed by a computing system, perform a method for implementing coupon service subsystem, the non-transitory computer readable media comprising instructions for:
   receiving a request from a customer for a first portion of a manufacturing process associated with a product;
   generating a first coupon for a first rebate value for the first portion of the manufacturing process;
   determining, based on the request, if a second portion of the manufacturing process is available to the customer;
   generating, if the second portion of the manufacturing process is available to the customer, a second coupon for a second rebate value for the second portion of the manufacturing process; and
   providing at least one of the first coupon and the second coupon to the customer.

2. The non-transitory computer readable media of claim 1, wherein the coupon service subsystem comprises a coupon service module for associating a manufacturing entity with the first portion and/or the second portion of the manufacturing process for completion thereof, a coupon generator for generating the first coupon and the second coupon, a coupon maintainer for processing coupon operations, a first interface module for connecting the coupon service subsystem to a storage media for storing coupon related data, a second interface module for connecting to the manufacturing entity, and a coupon controller for coordinating the coupon generator and the coupon maintainer.

3. The non-transitory computer readable media of claim 2, wherein the coupon-service subsystem further comprises:

a service database designed for storing manufacturing process related data; and
a communication interface module for communicating coupon and manufacturing process related information.

4. The non-transitory computer readable media of claim 2, wherein the coupon generator is designed to generate at least one of the first coupon and the second coupon responding to the request including buying, earning, gifting, benefiting, and combination thereof.

5. The non-transitory computer readable media of claim 2, wherein the coupon maintainer is designed for responding to a coupon action selected from the group consisting of buying the first portion and/or the second portion of the manufacturing process, transferring coupon, checking, and modifying.

6. The non-transitory computer readable media of claim 2, wherein the manufacturing entity is distributed in a plurality of manufacturing entities.

7. The non-transitory computer readable media of claim 2, wherein the manufacturing entity comprises at least one wafer fabrication facility and one mask-shop.

8. The non-transitory computer readable media of claim 1, wherein the coupon is defined with a plurality of attributes including point, duration, association, and combination thereof.

9. The non-transitory computer readable media of claim 1, wherein the the first manufacturing process and/or the second manufacturing process comprises one selected from the group consisting of wafer products, mask products, wafer shuttle system, Design for manufacturing (DFM), lithography process check (LPC), Fab support service, assembly and test service, eFoundry service, turnkey manufacturing service, or a combination thereof.

10. The non-transitory computer readable media of claim 9, wherein the first manufacturing process and/or the second manufacturing process optionally comprises fabricating a wafer lot in a hot lot mode to shorten manufacturing cycle time.

11. A system for implementing a coupon-based manufacturing process, the system comprising:
   a computing device including instructions for:
      generating a first coupon for a first rebate value for a first portion of a manufacturing process associated with a product, based on a request received from a customer;
      determining, based on the request, if the customer is eligible for a second coupon for a second portion of the manufacturing process;
      generating, if the customer is eligible, a second coupon for a second rebate value for the second portion of the manufacturing process; and
      directing the customer to a manufacturing entity for completion of the first portion and/or the second portion of the manufacturing process.

12. The system of claim 11, wherein generating a first coupon includes:
   taking the request from the customer, the request associated with the first portion of the manufacturing process, the first portion including at least one of a prototyping service, a design for manufacturing (DFM) service, a lithography process check (LPC) service, a fabrication support service, an assembly and test service, a web-based semiconductor information service, a turnkey manufacturing service, and combinations thereof;
   extracting service parameters associated with the first portion from the request; and
   generating the first coupon based on the service parameters.

13. The system of claim 12, wherein generating a first coupon further comprises:
   implementing a coupon action associated with the coupon using a coupon maintainer.

14. The system of claim 13, wherein the implementing of the coupon action includes:
   processing the coupon action;
   modifying the plurality of attributes based on the coupon action; and
   distributing information regarding the coupon action.

15. The system of claim 14, wherein the distributing information regarding the coupon action includes distributing information to the customer, a service provider, and a coupon database.

16. The system of claim 12, wherein generating a first coupon further comprises:
   processing a coupon request selected from the group consisting of buying, earning, gifting, benefiting, and a combination thereof;
   issuing the coupon based on the coupon request; and
   distributing information regarding the coupon.

17. The system of claim 16, wherein the issuing of the coupon includes defining the coupon with a plurality of attributes.

18. The system of claim 17, wherein the defining of the plurality of attributes includes defining point, duration, and association.

19. The system of claim 11, wherein the first manufacturing process optionally includes fabricating a wafer lot in a shortened cycle time.

20. The system of claim 11, wherein the first manufacturing process optionally includes at least one of making semiconductor wafers in a wafer fabrication entity and making masks in a mask workshop.

21. A system for implementing a coupon-based manufacturing process, the system comprising:
   a computing device including instructions for:
      receiving a first request from a customer for a first portion of a manufacturing process associated with a product;
      generating a first coupon for a first rebate value for the first portion of the manufacturing process;
      receiving a second request from a customer for a second portion of the manufacturing process associated with the product;
      generating a second coupon for a second rebate value for the second portion of the manufacturing process;
      providing at least one of the first coupon and the second coupon to the customer.

* * * * *